(12) United States Patent
Yonetsu (10) Patent No.: US 8,960,245 B2
(45) Date of Patent: Feb. 24, 2015

(54) PNEUMATIC TIRE AND MANUFACTURING METHOD OF PNEUMATIC TIRE

(75) Inventor: Isao Yonetsu, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 380 days.

(21) Appl. No.: 13/366,762

(22) Filed: Feb. 6, 2012

(65) Prior Publication Data
US 2012/0205021 A1  Aug. 16, 2012

(30) Foreign Application Priority Data
Feb. 10, 2011  (JP) .................. 2011-027276

(51) Int. Cl.
B60C 19/08 (2006.01)
B60C 13/02 (2006.01)
B29D 30/08 (2006.01)
B29D 30/72 (2006.01)

(52) U.S. Cl.
CPC ............. B60C 19/08 (2013.01); B60C 13/02 (2013.01); B60C 19/086 (2013.01); B29D 30/08 (2013.01); B29D 30/72 (2013.01); *Y10S 152/02* (2013.01)
USPC .............. 152/152.1; 152/523; 152/DIG. 2

(58) Field of Classification Search
CPC ...... B60C 19/08; B60C 19/086; B60C 13/02; B29D 30/08; B29D 30/72
USPC .............. 152/152.1, 209.16, 523, DIG. 2; 156/523, 123
See application file for complete search history.

(56) References Cited

U.S. PATENT DOCUMENTS

| | | | | |
|---|---|---|---|---|
| 1,462,984 A | * | 7/1923 | Schenuit | 152/153 |
| 2,339,546 A | * | 1/1944 | Hanson | 152/152.1 |
| 6,189,586 B1 | * | 2/2001 | Guidry | 152/209.15 |

(Continued)

FOREIGN PATENT DOCUMENTS

| | | |
|---|---|---|
| CN | 101522442 A | 9/2009 |
| JP | 48-057302 | 8/1973 |

(Continued)

OTHER PUBLICATIONS

European Search Report dated May 22, 2012, issued in corresponding European Patent Application No. 12154481.1 (4 pages).

(Continued)

*Primary Examiner* — Justin Fischer
*Assistant Examiner* — Robert Dye
(74) *Attorney, Agent, or Firm* — Westerman, Hattori, Daniels & Adrian, LLP (57) ABSTRACT

A pneumatic tire has a tread rubber formed by a nonconductive rubber and a side wall rubber formed by the nonconductive rubber. An outer surface of the side wall rubber is provided with a band-like diametrical conductive portion which is formed by a conductive rubber and extends along a tire diametrical direction. An outer end of the diametrical conductive portion is exposed to a ground-contacting surface or is connected to a conductive rubber member which is exposed to the ground-contacting surface. An inner end of the diametrical conductive portion is exposed to a rim contact region or is connected to a rim strip rubber formed by the conductive rubber. A narrow groove is formed by depressing an outer surface of the diametrical conductive portion and extends in a tire diametrical direction in a side wall portion.

10 Claims, 5 Drawing Sheets

(56) References Cited

U.S. PATENT DOCUMENTS

| | | | |
|---|---|---|---|
| 2007/0034312 A1* | 2/2007 | Matsumoto | 152/523 |
| 2008/0295934 A1 | 12/2008 | Mafune et al. | |
| 2009/0308512 A1 | 12/2009 | Nakamura | |
| 2010/0000648 A1* | 1/2010 | Nakano | 152/523 |

FOREIGN PATENT DOCUMENTS

| | | |
|---|---|---|
| JP | 2001-233026 A | 8/2001 |
| JP | 2004-268863 A | 9/2004 |
| JP | 2008-296634 A | 12/2008 |

OTHER PUBLICATIONS

Chinese Office Action dated Feb. 12, 2014, issued in corresponding Chinese Patent Application No. 201210027670.3, w/English translation (12 pages).

* cited by examiner

PNEUMATIC TIRE AND MANUFACTURING METHOD OF PNEUMATIC TIRE

BACKGROUND OF THE INVENTION

1. Field of the Invention

The present invention relates to a pneumatic tire which can discharge a static electricity generated in a vehicle body and a tire, to a road surface, and a manufacturing method of the pneumatic tire.

2. Description of the Related Art

In recent years, there has been proposed a pneumatic tire in which a rubber member such as a tread rubber or a side wall rubber is formed by a nonconductive rubber which is blended with a silica at a high ratio, in order to reduce rolling resistance of the tire which has a close relationship with fuel consumption efficiency. However, compared to a conventional rubber member blended with carbon black at a high ratio, such a rubber member has a higher electric resistance, and therefore static charge generated on a vehicle body or a tire is prevented from being released to a road surface. As a result, a problem such as radio noises tends to occur.

Accordingly, there has been developed a pneumatic tire which can achieve electrical conduction performance by setting a conductive portion which is made of a conductive rubber blended with carbon black or the like, while forming a tread rubber and a side wall rubber by a nonconductive rubber. For example, in a pneumatic tire described in Japanese Unexamined Patent Publication No. 2008-296634, a conductive path for releasing static charge is formed by setting a band-like rubber strip which is formed by a conductive rubber and extends in a tire diametrical direction on an outer surface of a side wall rubber. Further, Japanese Unexamined Patent Publication Nos. 2004-268863 and 48-57302 describe a tire formed with a conductive path in the same manner as above.

However, in the tire in which the band-like conductive portion extending in the tire diametrical direction is provided on the outer surface of the side wall rubber as mentioned above, the conductive path is disconnected by an external damage of the side wall rubber caused by contact with a curb, which may deteriorate electrical conduction performance.

SUMMARY OF THE INVENTION

The present invention has been made in view of the above circumstances, and an object thereof is to provide a pneumatic tire that can secure electrical conduction performance by preventing the disconnection of a conductive path due to an external damage of a side wall rubber, and a manufacturing method of the pneumatic tire.

The object can be achieved by the following present invention. The present invention provides a pneumatic tire comprising a toroidal carcass which reaches a bead portion from a tread portion via a side wall portion, a tread rubber which is formed by a nonconductive rubber and is provided in an outer side of the carcass in the tread portion, and a side wall rubber which is formed by the nonconductive rubber and is provided in an outer side of the carcass in the side wall portion, wherein an outer surface of the side wall rubber is provided with a band-like diametrical conductive portion which is formed by a conductive rubber and extends along a tire diametrical direction, an outer end of the diametrical conductive portion is exposed to a ground-contacting surface or is connected to a conductive rubber member which is exposed to the ground-contacting surface, and an inner end of the diametrical conductive portion is exposed to a rim contact region of the bead portion or is connected to a rim strip rubber which is formed by the conductive rubber, and wherein a narrow groove which is formed by depressing an outer surface of the diametrical conductive portion and extends in a tire diametrical direction is provided in the side wall portion.

According to the pneumatic tire, since the conductive path is formed so as to reach the rim from the ground-contacting surface via the band-like diametrical conductive portion which is provided in the outer surface of the side wall rubber, it is possible to achieve electrical conduction performance. In addition, since the narrow groove formed by depressing the outer surface of the diametrical conductive portion extends in the tire diametrical direction in the side wall portion, it is possible to suppress contact between an external damage factor such as a curb and the conductive rubber within the narrow groove. With this, it is possible to secure the electrical conduction performance by preventing the disconnection of the conductive path by the external damage of the side wall rubber.

In the pneumatic tire in accordance with the present invention, it is preferable that the outer surface of the side wall rubber is provided with a band-like circumferential conductive portion which is formed by the conductive rubber and extends in a tire circumferential direction, and the circumferential conductive portion traverses a plurality of the diametrical conductive portions which are arranged so as to be spaced in the tire circumferential direction. With this structure, since a plurality of diametrical conductive portions which are arranged so as to be spaced in the tire circumferential direction are connected by the circumferential conductive portion, a branched conductive path is formed. With this, even if the conductive rubber disappears by any chance at any of the narrow grooves due to a deep external damage of the side wall rubber, it is possible to well secure the electrical conduction performance.

In the above structure, it is preferable that an expression mark is formed by protruding an outer surface of the circumferential conductive portion. The expression mark is constituted by a letter, a numerical character, a sign, a pattern, or the like which displays a manufacturer or a kind of the tire, and is provided by being protruded from a surface of the side wall rubber. With the above structure, the protrusion of the expression mark serves as a protector so as to protect the diametrical conductive portion and the circumferential conductive portion from the external damage factor, and it is possible better prevent the disconnection of the conductive path.

Further, the present invention provides a manufacturing method of a pneumatic tire comprising the steps of forming an uncured tire by combining tire constituting members including a toroidal carcass which reaches a bead portion from a tread portion via a side wall portion, a tread rubber which is formed by a nonconductive rubber and is provided in an outer side of the carcass in the tread portion, and a side wall rubber which is formed by the nonconductive rubber and is provided in an outer side of the carcass in the side wall portion, arranging a band-like conductive tape which is formed by a conductive rubber along a tire diametrical direction, in an outer surface of the side wall rubber, exposing an outer end of the conductive tape to a ground-contacting surface or connecting an outer end of the conductive tape to a conductive rubber member which is exposed to the ground-contacting surface, and exposing an inner end of the conductive tape to a rim contact region of the bead portion or connecting an inner end of the conductive tape to a rim strip rubber which is formed by the conductive rubber, and forming a narrow groove which is formed by depressing an outer surface of the conductive tape and extends in a tire diametrical direction in the side wall portion, by setting the uncured tire to a curing mold so as to be subjected to a vulcanizing process, and pressing a projection which is provided in an inner surface of the curing mold against the conductive tape.

With this method, the conductive tape which is arranged on the outer surface of the side wall rubber serves as the diametrical conductive portion mentioned above, and a pneumatic tire which can achieve electrical conduction performance is manufactured. In addition, since the narrow groove mentioned above is provided in the side wall portion by pressing the projection of the curing mold against the conductive tape, it is possible to prevent the disconnection of the conductive path by the external damage of the side wall rubber, thereby securing the electrical conduction performance, in the tire after being manufactured.

In the manufacturing method of a pneumatic tire in accordance with the present invention, it is preferable that a plurality of the conductive tapes are arranged in such a manner as to be spaced in a tire circumferential direction and form pairs in the tire diametrical direction, and a width of one tape is made larger than a width of the other tape, in the conductive tapes which form the pair in the tire diametrical direction. With this method, even if the tire set in the curing mold is displaced in the tire circumferential direction, it is possible to allow a displacement in a wider side of the tape width in the conductive tapes which form a pair in the tire diametrical direction, and it is possible to accurately form the narrow groove. Further, since the tape width is made narrower in one of the conductive tapes forming a pair, it is possible to suppress the conductive rubber from becoming more unnecessarily.

In the manufacturing method of a pneumatic tire in accordance with the present invention, it is preferable that a plurality of the conductive tapes are arranged in such a manner as to be spaced in a tire circumferential direction and form pairs in the tire diametrical direction, and the conductive tapes forming the pairs in the tire diametrical direction are arranged in an offset manner so as to be inverted to each other in the tire circumferential direction. With this method, even if the tire set in the curing mold is displaced in the tire circumferential direction, it is possible to allow the displacement in one of the conductive tapes forming a pair in the tire diametrical direction regardless of the direction of the displacement, and it is possible to accurately form the narrow groove.

DETAILED DESCRIPTION OF THE PREFERRED EMBODIMENTS

An embodiment of the present invention will be explained with reference to the drawings. A pneumatic tire T shown in FIG. 1 includes a pair of bead portions 1, side wall portions 2 extending from the bead portions 1 to outer side in a tire diametrical direction, a tread portion 3 connected to outer ends in a tire diametrical direction of the side wall portions 2. The bead portion 1 includes an annular bead core 1a composed of a bundle of steel wires or the like sheathed with rubber and a bead filler 1b of hard rubber disposed therein.

Figure 1:
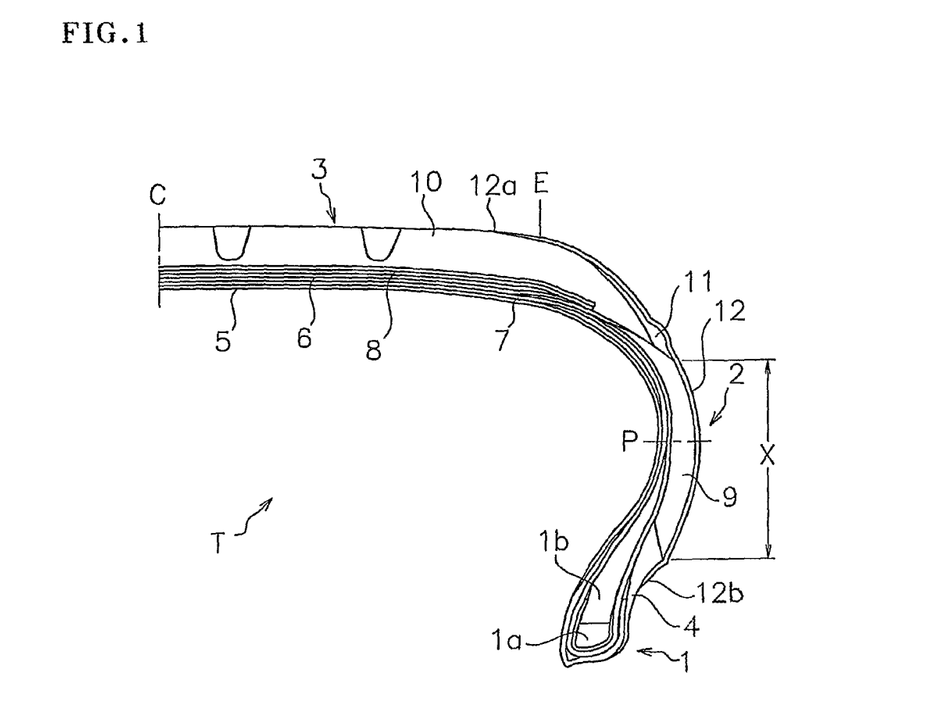
FIG. 1 is a half cross sectional view of a tire meridian showing one example of a pneumatic tire according to the present invention.

Further, the tire T is provided with a toroidal carcass 7 which reaches the bead portion 1 from the tread portion 3 via the side wall portion 2. The carcass layer 7 is constructed by at least one carcass ply, and an end portion thereof is fixed in a state in which it is wound up via the bead core 1a. The carcass ply is formed by coating a cord which extends approximately perpendicularly to a tire equator C with a topping rubber. An inner liner rubber 5 for maintaining air pressure is provided on the inside of the carcass layer 7.

Further, the pneumatic tire T is provided with a tread rubber 10 which is formed by a nonconductive rubber and is provided in an outer side of the carcass 7 in the tread portion 3, side wall rubber 9 which is formed by the nonconductive rubber and is provided in the outer side of the carcass 7 in the side wall portion 2, and rim strip rubber 4 which is formed by a conductive rubber and is provided in the outer side of the carcass 7 in the bead portion 1. A belt 6 is provided in an inner side of the tread rubber 10 to reinforce the carcass 7, and a belt reinforcing member 8 is provided in an outer side of the belt 6.

The present embodiment employs a tread-on side structure in which an end portion of the tread rubber 10 is mounted on an end portion of the side wall rubber 9, and a tread strip 11 having a triangular cross sectional shape is joined to a side portion of the tread rubber 10. However, the pneumatic tire according to the present invention is not limited to this structure, but can employ a side-on tread structure in which the end portion of the side wall rubber 9 is mounted on an end portion of the tread rubber 10.

The conductive rubber points to a rubber in which a specific volume resistance is less than $10^8$ Ω·cm, and is produced, for example, by blending a carbon black serving as a reinforcing agent in a raw material rubber at a high ratio. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the nonconductive rubber points to a rubber in which a specific volume resistance is equal to or more than $10^8$ Ω·cm, and is produced, for example, by blending a silica serving as the reinforcing agent in the raw material rubber at a high ratio.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

Figure 2:
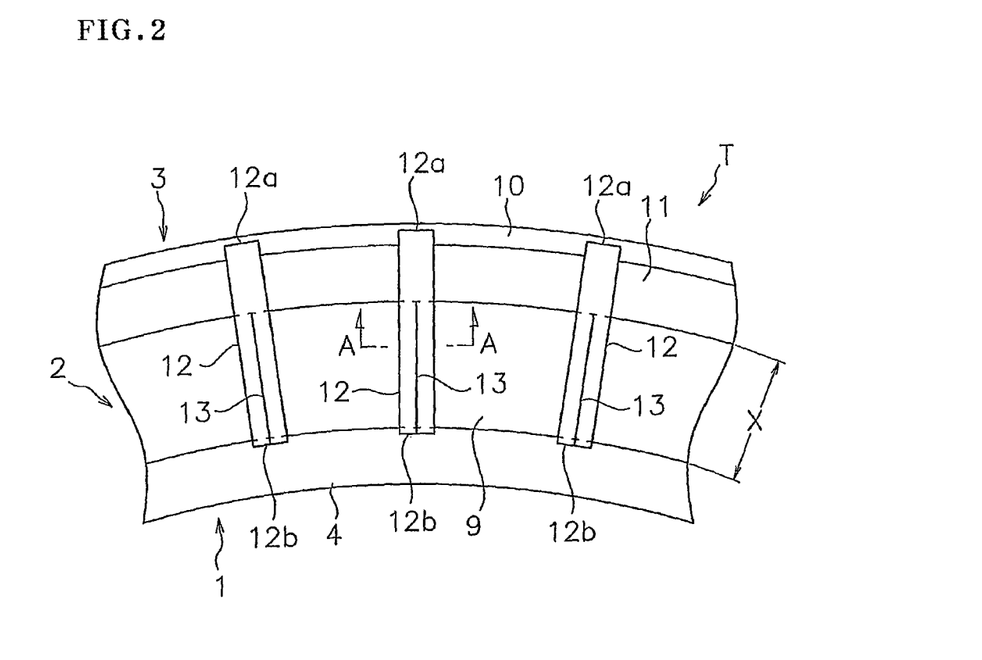
FIG. 2 is a view of an outer surface of the pneumatic tire shown in FIG. 1 when viewed from a tire width direction.

As shown in FIGS. 1 and 2, an outer surface of the side wall rubber 9 is provided with a band-like diametrical conductive portion 12 which is formed by the conductive rubber and extends along a tire diametrical direction. It is preferable that the diametrical conductive portion 12 is arranged at a plurality of positions (for example, four to eight positions) on circumference while setting a distance in a tire circumferential direction. In the present embodiment, the diametrical conductive portion 12 is provided in a region X which runs into an inner peripheral end from an outer peripheral end of the side wall rubber 9 in a tire outer surface, and is elongated so as to protrude up and down from the region X.

In an outer side in the tire diametrical direction than the region X, the diametrical conductive portion 12 extends along the outer surfaces of the tread strip 11 and the tread rubber 10, and an outer end 12a is exposed to a ground-contacting surface. Further, in an inner side in the tire diametrical direction than the region X, the diametrical conductive portion 12 extends along the outer surface of the rim strip rubber 4, and an inner end 12b is connected to the rim strip rubber 4. At the time of being installed to the rim, a rim comes into contact with an outer surface of the rim strip rubber 4, and a conductive path is formed from the rim via the rim strip rubber 4 and the diametrical conductive portion 12, whereby it is possible to achieve electrical conduction performance.

In the above, the ground-contacting surface is a surface which grounds on a road surface at the time of rim assembling in a normal rim, putting the tire on the flat road surface in a state in which a normal internal pressure is filled, and applying a normal load, and an outermost position in a tire axial direction serves as a ground-contacting end E. The normal load and the normal internal pressure are set to a maximum load (a designed normal load in the case of a tire for a passenger car) which is defined in JISD4202 (specifications of an automobile tire) and a corresponding pneumatic pressure thereto, and the normal rim is a standard rim which is defined in JISD4202 in principle.

Figure 3:
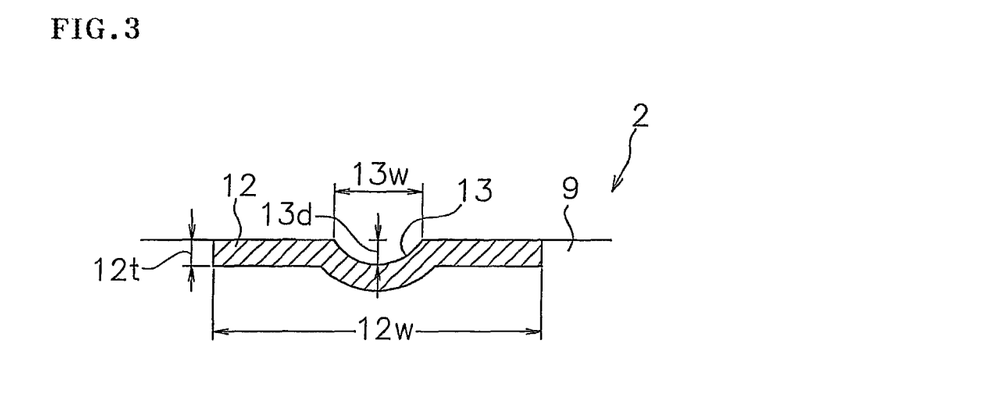
FIG. 3 is a cross sectional view as seen from an arrow A-A in FIG. 2.

As shown in FIGS. 2 and 3, in the tire T, the side wall portion 2 is provided with a narrow groove 13 which is formed by depressing an outer surface of the diametrical conductive portion 12 and extends along the tire diametrical direction. With this structure, it is possible to suppress contact between an external damage factor such as a curb and the conductive rubber within the narrow groove 13, and it is possible to secure the electrical conduction performance by preventing the disconnection of the conductive path by the external damage of the side wall rubber. Specifically, even if the side wall rubber 9 has undergone the external damage by the contact with the curb, the conductive rubber within the narrow groove 13 tends to remain, whereby it is possible to keep a electrical conduction performance.

In order to enhance the effect of reducing the rolling resistance of the tire, it is desirable to reduce a volume of the conductive rubber in the diametrical conductive portion 12, while forming the side wall rubber 9 and the tread rubber 10 by the nonconductive rubber. In the present invention, since it is possible to protect the conductive path from the external damage of the side wall rubber 9 as mentioned above, it is possible to form the diametrical conductive portion 12 thin, and for example, to set a thickness 12t thereof between 0.1 and 0.7 mm, more preferably between 0.2 and 0.5 mm.

A width 12w of the diametrical conductive portion 12 is preferably between 10 and 50 mm, and is more preferably between 10 and 20 mm. If the width 12w is less than 10 mm, there is such a tendency that positioning between the tire and a curing mold becomes severe at the time of forming the narrow groove 13 in accordance with a method mentioned below. Further, in such a structure that the outer end 12a of the diametrical conductive portion 12 is exposed to the ground-contacting surface as in the present embodiment, it is desirable to make the width 12w larger than a groove width of a lateral groove (not shown) formed in the surface of the tread rubber 10 in such a manner as to prevent the diametrical conductive portion 12 from entering into the lateral groove.

The narrow groove 13 is formed in a U-shaped cross section, and is provided in the region X so as to be formed narrower than the diametrical conductive portion 12. A depth 13d of the narrow groove 13 is preferably equal to or more than 1 mm in such a manner as to appropriately avoid damage of the conductive rubber within the narrow groove 13, and is set, for example, to 1 to 2 mm. Further, it is preferable that the width 13w of the narrow groove 13 is equal to or more than triple of the depth 13d, whereby it is possible to make a depression of the narrow groove 13 gentle, and it is possible to suppress generation of a crack beginning at a groove bottom.

Figure 4:
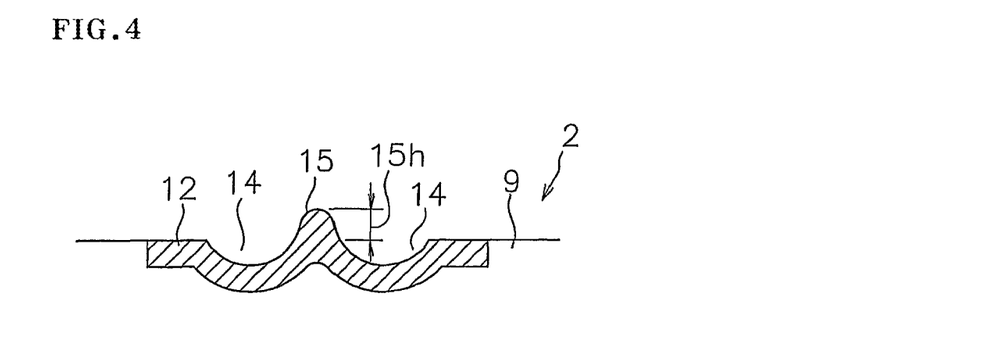
FIG. 4 is a cross sectional view showing a modified example of the narrow groove.

In an example shown in FIG. 4, the side wall portion 2 is provided with a pair of narrow grooves 14 which extend in parallel, and is provided with a projection 15 which extends in the tire diametrical direction between them. In this shape, since the projection 15 which protrudes from an outer surface of the diametrical conductive portion 12 serves as a protector, and can protect the conductive rubber within the narrow groove 14 from an external damage factor, it is possible to better prevent the disconnection of the conductive path. The narrow groove 14 is provided in the same manner as the narrow groove 13 mentioned above. A height 15h of the projection 15 is set, for example, between 0.5 and 1.0 mm.

Figure 5:
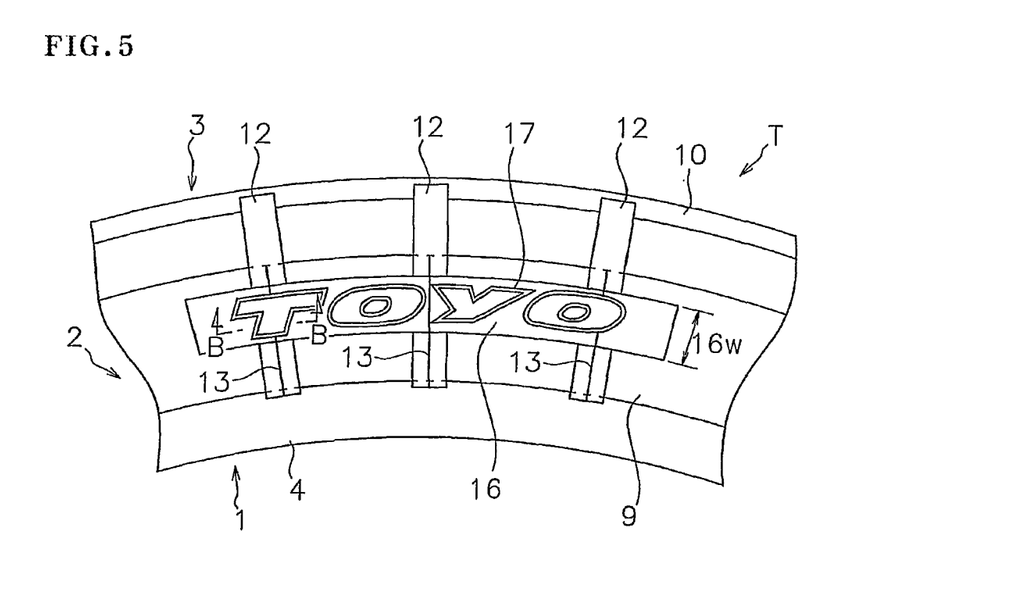
FIG. 5 is a view of an outer surface of a pneumatic tire according to another embodiment of the present invention when viewed from a tire width direction.

As shown in FIG. 5, an outer surface of the side wall rubber 9 may be provided with a band-like circumferential conductive portion 16 which is formed by a conductive rubber and extends along a tire circumferential direction. The circumferential conductive portion 16 traverses a plurality of diametrical conductive portions 12 which are arranged so as to be spaced in the tire circumferential direction, so that the branched conductive path is formed. With this, even if the conductive rubber disappears by any chance at any of the narrow grooves 13 due to a deep external damage of the side wall rubber 9, it is possible to well secure the electrical conduction performance.

Figure 6:
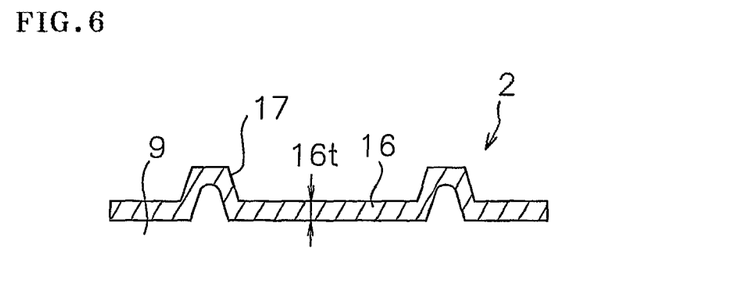
FIG. 6 is a cross sectional view as seen from an arrow B-B in FIG. 5.

In this example, an expression mark 17 including letters "TOYO" is formed by protruding the outer surface of the circumferential conductive portion 16 as shown in FIG. 6. The protrusion of the expression mark 17 serves as the protector, whereby it is possible to protect the diametrical conductive portion 12 and the circumferential conductive portion 16 from the external damage factor, and it is possible to better prevent the disconnection of the conductive path. In order to secure the protecting action mentioned above, the expression mark 17 is provided in a range which includes a tire maximum width position P (see FIG. 1). In the present embodiment, the expression mark 17 is protruded along its outline, however, the entire expression mark 17 may be protruded.

The circumferential conductive portion 16 may extend annularly along the tire circumferential direction, however, in order to reduce the volume of the conductive rubber, it is preferable that the circumferential conductive portion 16 is provided in such a manner as to correspond to an arranged region of the expression mark 17 as in the present embodiment. A thickness 16t of the circumferential conductive portion 16 can be set to be equal to the thickness 12t of the diametrical conductive portion 12. Further, a width 16w of the circumferential conductive portion 16 is smaller than the region X, and is set to such a size that can include the expression mark 17.

Next, a description will be given of one example of a method of manufacturing the pneumatic tire T. First of all, an uncured tire is formed by combining the tire constituting members such as the carcass 7, the tread rubber 10, and the side wall rubber 9. In the present embodiment, in addition to the members mentioned above, a bead core 1a, a bead filler 1b, a rim strip rubber 4, an inner liner rubber 5, a belt 6, a belt reinforcing member 8 and a tread strip 11 are combined.

Figure 7:
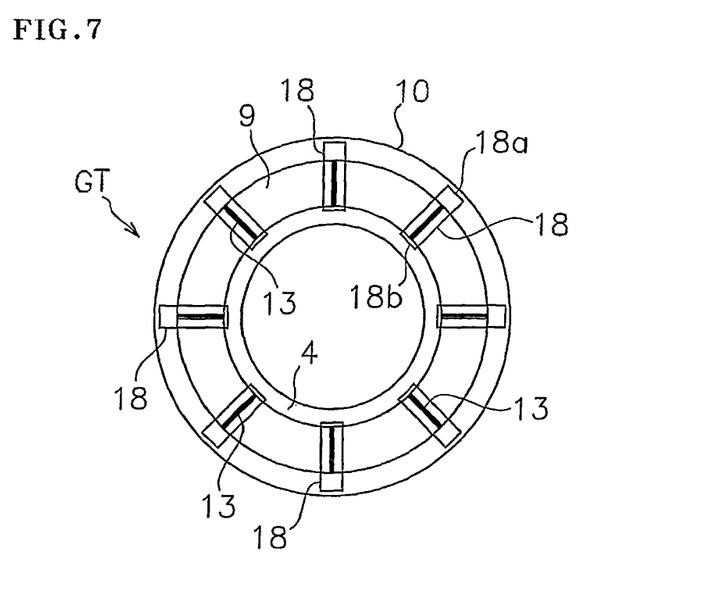
FIG. 7 is a schematic view of a tire for explaining an arrangement of a diametrical conductive portion and a narrow groove.

Next, as shown in FIG. 7, a band-like conductive tape 18 which is formed by a conductive rubber is arranged in an outer surface of the side wall rubber 9 along a tire diametrical direction, with respect to an uncured tire GT. At this time, an outer end 18a of the conductive tape 18 is exposed to the ground-contacting surface, and an inner end 18b of the conductive tape 18 is connected to the rim strip rubber 4 which is formed by the conductive rubber. In this example, the conductive tapes 18 are arranged at eight positions on the circumference. In the tire after being manufactured, the conductive tape 18 serves as the diametrical conductive portion 12.

Figure 8:
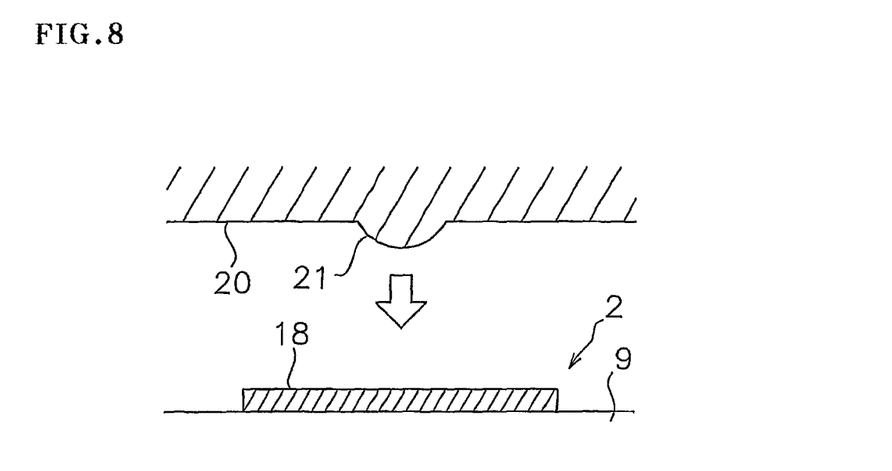
FIG. 8 is a cross sectional view showing a state in which the narrow groove is provided.

Subsequently, the uncured tire GT is set in the curing mold, and is subjected to a curing process by applying required heat and pressure. At this time, as shown in FIG. 8, the narrow groove 13 as shown in FIG. 3 is provided in the side wall portion 2 by pressing a projection 21 which is provided in an inner surface of the curing mold 20 against the conductive tape 18. The projection 21 is provided in the inner surface of the curing mold 20, and extends in the tire diametrical direction at a position which corresponds to the region X.

In the case of FIG. 4, the narrow grooves 14 are provided by a pair of projections which are provided in the inner surface of the curing mold, and the projection 15 is provided by a concave groove which is provided between the pair of projections. With this structure, it is advantageously possible to achieve an air venting action at the time of the vulcanization molding through the concave groove. Further, in the case that the circumferential conductive portion 16 is provided, the curing process may be applied after arranging the band-like conductive tape which serves as the circumferential conductive portion 16. The expression mark 17 is formed by a concave portion which is provided in the inner surface of the curing mold 20.

Figure 9:
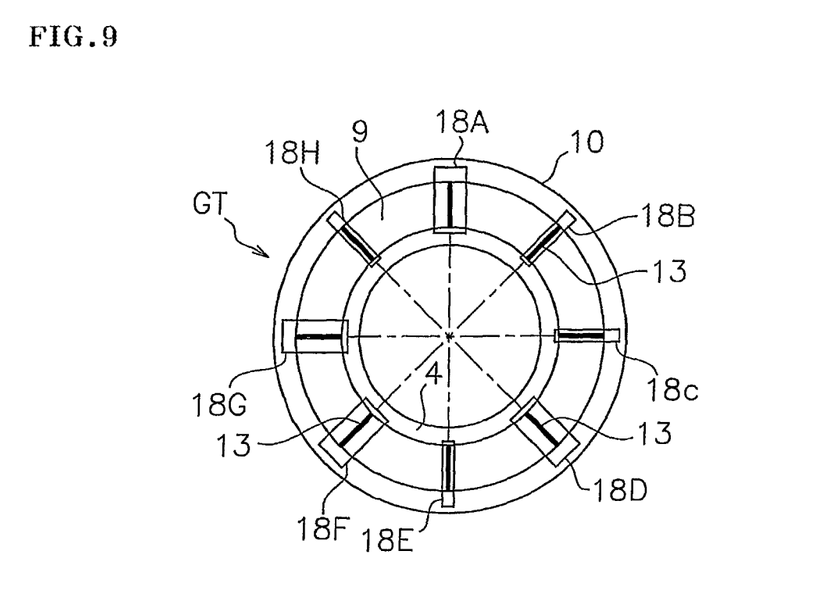
FIG. 9 is a view showing an arrangement example of a conductive tape.

In an example in FIG. 9, a plurality of conductive tapes 18A to 18H are arranged so as to be spaced in the tire circumferential direction and form pairs in the tire diametrical direction, and a tape width of one is made larger than a tape width of the other in the conductive tapes which form the pair in the tire diametrical direction. Specifically, the tape width is set larger in the conductive tape 18A than in the conductive tape 18E, larger in the conductive tape 18F than in the conductive tape 18B, larger in the conductive tape 18G than in the conductive tape 18C, and larger in the conductive tape 18D than in the conductive tape 18H, respectively.

In this case, even if the tire GT set in the curing mold is displaced in the tire circumferential direction, it is possible to allow a displacement in a wider side of the tape width in the conductive tapes which form a pair in the tire diametrical direction regardless of the direction of the displacement, and it is possible to accurately form the narrow groove 13. Further, since the tape width is narrower in one (that is, the conductive tapes 18B, 18C, 18E and 18H) of the conductive tapes forming the pairs, it is possible to reduce the volume of the conductive rubber. As the tape width, 50 mm and 20 mm are exemplified in the wider side and the narrower side, respectively.

Figure 10:
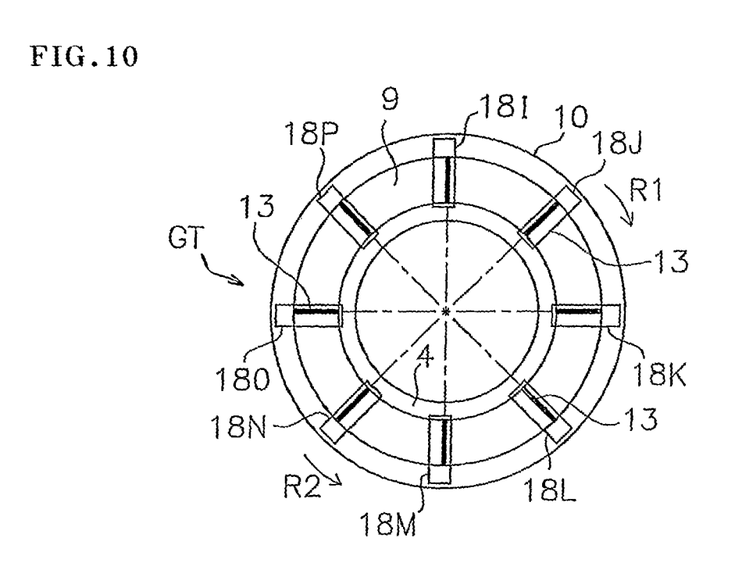
FIG. 10 is a view showing an arrangement example of a conductive tape.

In an example in FIG. 10, a plurality of conductive tapes 18I to 18P are arranged so as to be spaced in the tire circumferential direction and form pairs in the tire diametrical direction, and the conductive tapes which form the pair in the tire diametrical direction are arranged in an offset manner so as to be inverted to each other in the tire circumferential direction. For example, the conductive tape 18J is arranged in an offset manner in such a manner that a center of a tape width is shifted in a direction of R1 from a set position of the narrow groove 13, and the conductive tape 18N forming the pair with the conductive tape 18J is arranged in an offset manner in such a manner as to be shifted in a direction of R2 which is inverted thereto. The other conductive tapes are arranged in the same manner.

In this case, even if the tire GT set in the curing mold is displaced in the tire circumferential direction, it is possible to allow the displacement in one of the conductive tapes forming a pair in the tire diametrical direction regardless of the direction of the displacement, and it is possible to accurately form the narrow groove 13. For example, in the conductive tapes 18J and 18N, a displacement in the direction of R1 of the tire can be accepted by the conductive tape 18N, and a displacement in the direction of R2 of the tire can be accepted by the conductive tape 18J. As the tape width of the conductive tape, 30 mm is exemplified.

Other Embodiments (1) In the embodiment mentioned above, there is exemplified the example in which the outer end 12a of the diametrical conductive portion 12 is exposed to the ground-contacting surface, however, in place of this, the outer end of the diametrical conductive portion may be connected to a conductive rubber member which is exposed to the ground-contacting surface. In an example in FIG. 11, a conductive rubber member 19 in which one end is exposed to the ground-contacting surface and the other end reaches the side wall rubber 9 is embedded in the tread rubber 10, and the outer end 12a of the diametrical conductive portion 12 is connected to the conductive rubber member 19. The other end of the conductive rubber member 19 may be made to reach a bottom surface or an outer peripheral surface of the tread rubber 10.

Figure 11:
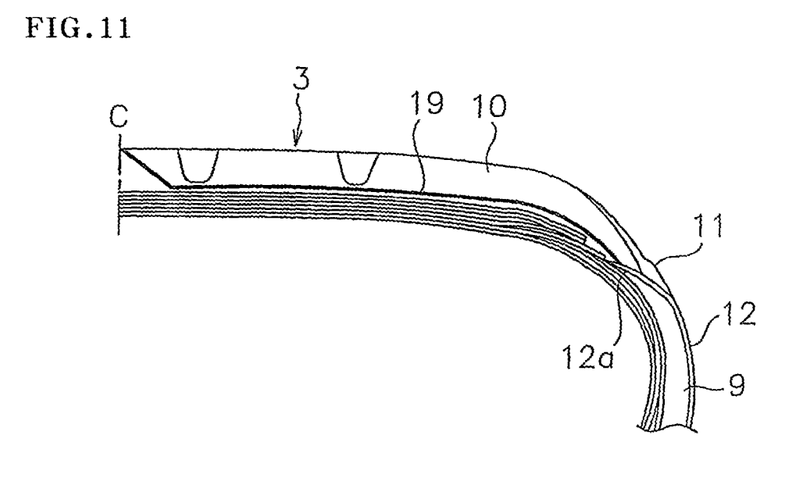
FIG. 11 is a cross sectional view showing an example in which a conductive rubber member is provided in a tread rubber.

In the structure in which the diametrical conductive portion 12 is interposed between the side wall rubber 9 and the tread rubber 10 as mentioned above, the conductive tape may be previously arranged in the outer surface of the side wall rubber 9, in a preliminary stage toward the formation of the uncured tire. In this case, since the diametrical conductive portion 12 is connected to the conductive rubber member 19 at the time of forming the uncured tire, a step of forming the uncured tire is carried out at the same time of a step of arranging the outer end and the inner end of the conductive tape at predetermined positions.

(2) In the embodiment mentioned above, the tread strip 11 may be formed by a conductive rubber member. Specifically, the tread strip 11 is formed by the conductive rubber, and an upper end portion of the tread strip 11 is arranged in an inner side in the tire width direction than the ground-contacting end E so as to be exposed to the ground-contacting surface, thereafter the outer end 12a of the diametrical conductive portion 12 may be connected to the tread strip 11.

(3) In the embodiment mentioned above, the example employing the tread-on side structure is shown, however, in the case of employing the side-on tread structure, the upper end portion of the side wall rubber may be arranged in the inner side in the tire width direction than the ground-contacting end, and the outer end of the diametrical conductive portion which is provided in the outer surface of the side wall rubber may be exposed to the ground-contacting surface.

(4) In the embodiment mentioned above, there is shown the example in which the inner end 12b of the diametrical conductive portion 12 is connected to the rim strip rubber 4 which is formed by the conductive rubber, however, in place of this, the diametrical conductive portion 12 may be further extended to the inner side in the tire diametrical direction, and the inner end 12b thereof may be exposed to the rim contact region of the bead portion 1. In this case, since the rim strip rubber 4 can be formed by the nonconductive rubber, it is possible to enhance the effect of improving the rolling resistance by reducing the volume of the conductive rubber while keeping the electrical conduction performance.

Example

In order to specifically show the structure and the effect of the present invention, a test for electrical conduction performance was carried out, and will be described. In the test, the electrical conduction performance was evaluated by using a tire having a size 215/50R17, carrying out a buff application to the tire circumferential direction in such a manner as to traverses the diametrical conductive portion, forming an external damage having a width 5 mm and a depth 1 mm, and determining a case that a conductive path capable of releasing static charge to a road surface exists after the buff application as ○, and a case that it does not exist as x.

In the tire having the structure shown in FIG. 1, the tire in which the narrow groove is not provided was set to a comparative example 1, and the tire in which the projection is provided without the provision of the narrow groove was set to a comparative example 2. Further, the tire in which the narrow groove in FIG. 3 is provided was set to an example 1, and the tire in which the narrow groove in FIG. 4 is provided was set to examples 2 and 3. In the example 3, the expression mark was formed by being protruded, as well as the circumferential conductive portion was provided. A thickness of the diametrical conductive portion was set to 0.5 mm, and a width thereof was set to 30 mm. A depth of the narrow groove was set to 1 mm, and a width thereof was set to 3 mm. A height of the projection was set to 1 mm.

TABLE 1

| | Comparative example 1 | Comparative example 2 | Example 1 | Example 2 | Example 3 |
|---|---|---|---|---|---|
| Diametrical conductive portion | With | With | With | With | With |
| Circumferential conductive portion and expression mark | Without | Without | Without | Without | With |
| Narrow groove | Without | Convex (*1) | Concave (FIG. 3) | Convex concave (FIG. 4) | Convex concave (FIG. 4) |
| Electrical conduction performance (without external damage) | ○ | ○ | ○ | ○ | ○ |
| Electrical conduction performance (with external damage) | x | x | ○ | ○ | ○ |

*1 corresponds to shape that a pair of narrow grooves 14 are not provided in FIG. 4

From Table 1, it is known that the electrical conduction performance is deteriorated by the damage of the side wall rubber in the comparative examples 1 and 2, and the electrical conduction performance is secured even if the side wall rubber is damaged in the examples 1 to 3.

What is claimed is:

1. A pneumatic tire comprising:
    a toroidal carcass which reaches a bead portion from a tread portion via a side wall portion;
    a tread rubber which is formed by a nonconductive rubber and is provided in an outer side of the carcass in the tread portion; and
    a side wall rubber which is formed by the nonconductive rubber and is provided in an outer side of the carcass in the side wall portion, wherein
    an outer surface of the side wall rubber is provided with a band-like diametrical conductive portion which is formed by a conductive rubber and extends along a tire diametrical direction, an outer end of the diametrical conductive portion is exposed to a ground-contacting surface or is connected to a conductive rubber member which is exposed to the ground-contacting surface, and an inner end of the diametrical conductive portion is exposed to a rim contact region of the bead portion or is connected to a rim strip rubber which is formed by the conductive rubber, and
    wherein a narrow groove, which is formed by depressing an outer surface of the diametrical conductive portion and extends in a tire diametrical direction, is provided in the side wall portion, and the narrow groove is provided only on the diametrical conductive portion, and
    wherein the nonconductive rubber of the sidewall does not contain a narrow groove which extends in the diametrical direction.

2. The pneumatic tire according to claim 1, wherein the outer surface of the side wall rubber is provided with a band-like circumferential conductive portion which is formed by the conductive rubber and extends in a tire circumferential direction, and the circumferential conductive portion traverses a plurality of the diametrical conductive portions which are arranged so as to be spaced in the tire circumferential direction.

3. The pneumatic tire according to claim 2, wherein an expression mark is formed by protruding an outer surface of the circumferential conductive portion.

4. The pneumatic tire according to claim 2, wherein the circumferential conductive portion is provided in such a manner as to correspond to an arranged region of an expression mark.

5. The pneumatic tire according to claim 2, wherein a thickness of the circumferential conductive portion is set to be equal to a thickness of the diametrical conductive portion.

6. The pneumatic according to claim 1, wherein the diametrical conductive portion is arranged at four to eight positions on a tire circumference while setting a distance in a tire circumferential direction.

7. The pneumatic tire according to claim 1, wherein the narrow groove is provided in a region X, wherein the region X runs into an inner peripheral end from an outer peripheral end of the side wall rubber in a tire outer surface.

8. A manufacturing method of a pneumatic tire comprising the steps of:
    forming an uncured tire by combining tire constituting members including a toroidal carcass which reaches a bead portion from a tread portion via a side wall portion, a tread rubber which is formed by a nonconductive rubber and is provided in an outer side of the carcass in the tread portion, and a side wall rubber which is formed by the nonconductive rubber and is provided in an outer side of the carcass in the side wall portion;

arranging a band-like conductive tape which is formed by a conductive rubber along a tire diametrical direction, in an outer surface of the side wall rubber, exposing an outer end of the conductive tape to a ground-contacting surface or connecting an outer end of the conductive tape to a conductive rubber member which is exposed to the ground-contacting surface, and exposing an inner end of the conductive tape to a rim contact region of the bead portion or connecting an inner end of the conductive tape to a rim strip rubber which is formed by the conductive rubber; and forming a narrow groove, which is formed by depressing an outer surface of the conductive tape and extends in a tire diametrical direction in the side wall portion, only on the conductive tape by setting the uncured tire to a curing mold so as to be subjected to a vulcanizing process, and pressing a projection which is provided in an inner surface of the curing mold against the conductive tape, and wherein a narrow groove which extends in the diametrical direction is not formed in the nonconductive rubber of the sidewall rubber.

9. A manufacturing method of a pneumatic tire, comprising the steps of:

forming an uncured tire by combining tire constituting members including a toroidal carcass which reaches a bead portion from a tread portion via a side wall portion, a tread rubber which is formed by a nonconductive rubber and is provided in an outer side of the carcass in the tread portion, and a side wall rubber which is formed by the nonconductive rubber and is provided in an outer side of the carcass in the side wall portion;

arranging a band-like conductive tape which is formed by a conductive rubber along a tire diametrical direction, in an outer surface of the side wall rubber, exposing an outer end of the conductive tape to a ground-contacting surface or connecting an outer end of the conductive tape to a conductive rubber member which is exposed to the ground-contacting surface, and exposing an inner end of the conductive tape to a rim contact region of the bead portion or connecting an inner end of the conductive tape to a rim strip rubber which is formed by the conductive rubber; and forming a narrow groove which is formed by depressing an outer surface of the conductive tape and extends in a tire diametrical direction in the side wall portion, by setting the uncured tire to a curing mold so as to be subjected to a vulcanizing process, and pressing a projection which is provided in an inner surface of the curing mold against the conductive tape, wherein a plurality of the conductive tapes are arranged in such a manner as to be spaced in a tire circumferential direction and form pairs in the tire diametrical direction, and a width of one tape is made larger than a width of the other tape, in the conductive tapes which form the pair in the tire diametrical direction.

10. A manufacturing method of a pneumatic tire, comprising the steps of:

forming an uncured tire by combining tire constituting members including a toroidal carcass which reaches a bead portion from a tread portion via a side wall portion, a tread rubber which is formed by a nonconductive rubber and is provided in an outer side of the carcass in the tread portion, and a side wall rubber which is formed by the nonconductive rubber and is provided in an outer side of the carcass in the side wall portion;

arranging a band-like conductive tape which is formed by a conductive rubber along a tire diametrical direction, in an outer surface of the side wall rubber, exposing an outer end of the conductive tape to a ground-contacting surface or connecting an outer end of the conductive tape to a conductive rubber member which is exposed to the ground-contacting surface, and exposing an inner end of the conductive tape to a rim contact region of the bead portion or connecting an inner end of the conductive tape to a rim strip rubber which is formed by the conductive rubber; and forming a narrow groove which is formed by depressing an outer surface of the conductive tape and extends in a tire diametrical direction in the side wall portion, by setting the uncured tire to a curing mold so as to be subjected to a vulcanizing process, and pressing a projection which is provided in an inner surface of the curing mold against the conductive tape, wherein a plurality of the conductive tapes are arranged in such a manner as to be spaced in a tire circumferential direction and form pairs in the tire diametrical direction, and the conductive tapes forming the pairs in the tire diametrical direction are arranged in an offset manner so as to be inverted to each other in the tire circumferential direction.

* * * * *